Feb. 20, 1940. H. B. COOKE Re. 21,358
PURIFYING GASES
Original Filed Feb. 12, 1936
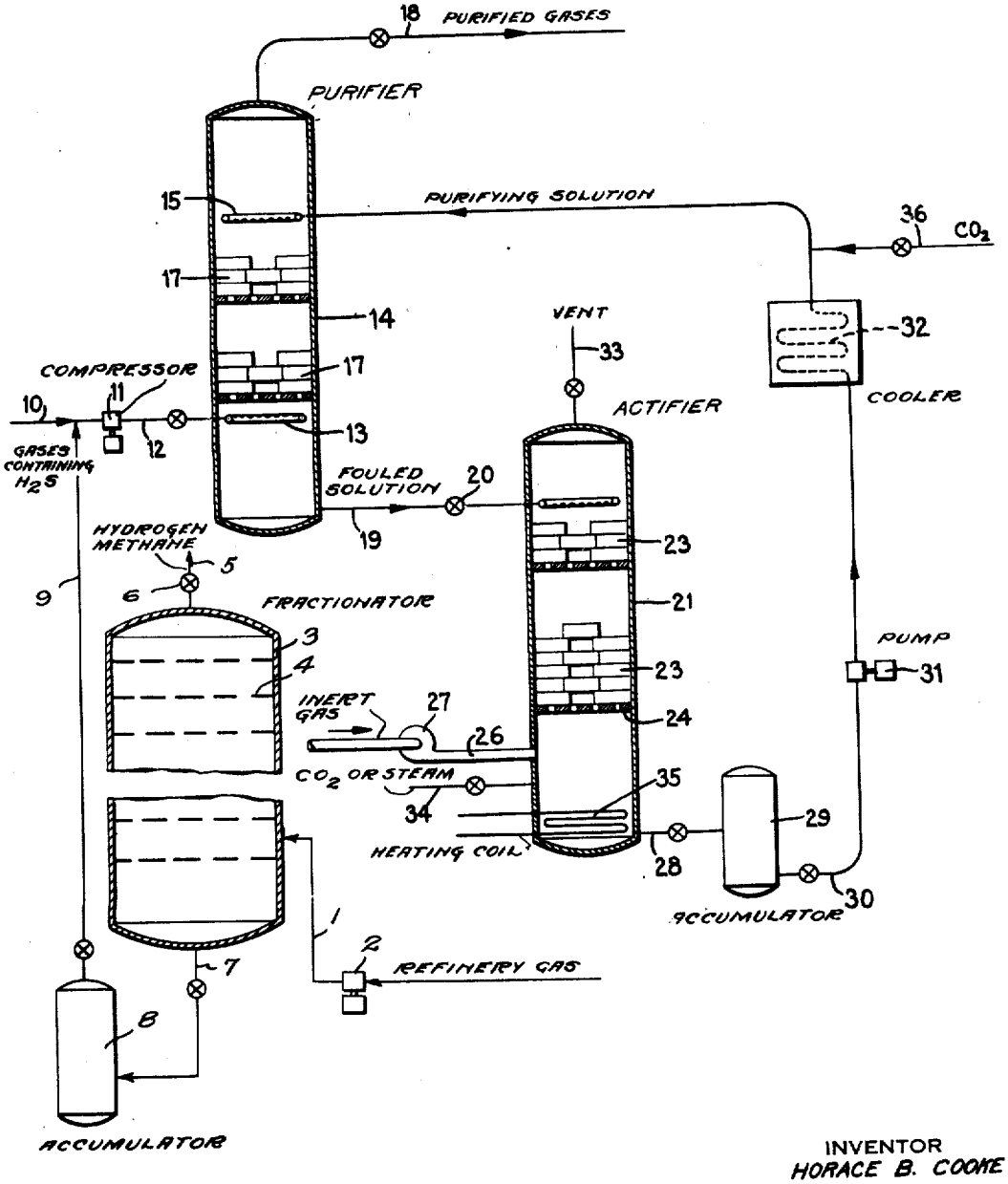
INVENTOR
HORACE B. COOKE
BY Pike H. Sullivan
ATTORNEY Reissued Feb. 20, 1940

Re. 21,358

UNITED STATES PATENT OFFICE 21,358

PURIFYING GASES

Horace B. Cooke, Alexandria, Va., assignor to Process Management Company, Inc., New York, N. Y., a corporation of Delaware Original No. 2,134,507, dated October 25, 1938, Serial No. 63,493, February 12, 1936. Application for reissue April 22, 1939, Serial No. 269,477

2 Claims. (Cl. 23—3)

This invention relates to a method of purifying gases and pertains more particularly to an improved method for removing hydrogen sulphide from gases by means of an alkaline solution such as sodium carbonate.

While my invention will have more general application, it is of special advantage in the purification of refinery gases resulting from the cracking of hydrocarbon oil; and wherein the purified gases are subjected to further processing for the formation of valuable products therefrom. Until recently these gases have been largely waste products and used as fuel in the oil-refining process and elsewhere. Under more modern practice, these gases, which contain a relatively large proportion of unsaturated hydrocarbons, have been subjected to polymerization treatment to produce liquid polymers within a motor-fuel boiling range and having exceptionally high anti-knock characteristics. The presence of hydrogen sulphide in the refinery gases delivered to the polymerization operation is objectionable for a number of reasons. It tends to cause corrosion of apparatus, imparts a disagreeable odor to the finished products, and may adversely affect the polymerization reaction, particularly when catalysts are employed. Moreover, the hydrogen sulphide may react with the hydrocarbons undergoing treatment, thereby resulting in a final product difficult or impossible to refine by ordinary methods.

It has heretofore been proposed to remove hydrogen sulphide from gases by contacting the same with an aqueous alkaline solution, such as a dilute solution of sodium carbonate. The primary reaction may be expressed as follows:

$$Na_2CO_3+H_2S \rightarrow NaHS+NaHCO_3$$

The spent alkaline solution is then reactified by subjecting the spent solution to conditions conducive to reversing the reaction as follows:

$$NaHS+NaHCO_3 \rightarrow H_2S+Na_2CO_3$$

In practice this is usually accomplished by blowing the solution with air or other inert gas. In such operations the amount of air required in the reactivation may be from two to three times the amount of gas purified.

Various other methods of "actifying" foul solutions of this character have been suggested, but are open to various disadvantages. Vacuum actification is expensive, and has not, so far as I know, been successful in this country. Simple alkaline solutions are not, under ordinary conditions, suitable for actification by heating, on account of the relatively low carrying capacity of such solutions for hydrogen sulphide. On the other hand, gas-purifying solutions, such as a solution of sodium phenolate, which are suitable for actification by heat, cannot be used for the purification of hydrocarbons in the liquid phase.

A principal object of my invention is to provide an improved process which will require equipment of smaller capacity per unit volume of gases treated, which will reduce the amount of alkaline solution necessary per unit volume of gases treated and wherein the actification or reactivation may be accomplished in a simpler and more economical manner.

Other and more detailed objects and advantages of my invention will be apparent from a more detailed description hereinafter.

In accordance with my invention, the hydrocarbon gas to be purified of hydrogen sulphide, such as refinery gas, or refinery gas which has been largely freed from hydrogen or methane by any of the old and well known methods, or other hydrocarbon gas largely composed of hydrocarbons having from two to four carbon atoms per molecule, while at a temperature at or below the critical thereof, is subjected to a pressure adequate to convert it into a liquid. This liquid is then contacted with a dilute sodium corbonate solution containing for example from 1 to 6% of sodium carbonate. Since the hydrogen sulphide is in liquid phase and is consequently more highly concentrated than it would be in vapor phase, the reaction velocity of the first named reaction and the proportion of sodium hydrosulphide resulting therefrom is increased. While the first reaction is believed to be the primary one taking place in the purifying zone, other reactions tending to increase the amount of hydrogen sulphide absorbed by the solution may take place. In any event, the amount of hydrogen sulphide absorbed by a given volume of alkaline solution is higher when the reaction is accomplished under the pressure required to maintain the hydrocarbons in liquid phase.

After contact with the hydrocarbons, the spent alkaline solution is separated from the purified liquid and actified under lower pressure, for example, at atmospheric pressure. Under the reduced pressure the concentration of hydrogen sulphide gas will be reduced, thus reversing the reaction and effecting a removal of the absorbed hydrogen sulphide. Additional hydrogen sulphide removal may be accomplished by subjecting the solution to heat or by blowing with air, steam, or other inert gas. During the removal of the hydrogen sulphide in the actification zone carbon dioxide may be released and where this occurs, the solution should be replenished in $CO_2$ somewhere in the cycle in order to maintain the sodium carbonate solution at the desired strength. The reactified alkaline solution is then returned to the system.

With the above general nature and principal objects in view, the invention will be better understood from the more detailed description hereinafter, in which reference will be made to the accompanying drawing forming a part of this description.

Referring to the drawing, the reference character 10 designates a charging line for receiving the gases to be treated to remove hydrogen sulphide therefrom. These gases are freed of hydrogen and methane prior to entering line 10 and a well known manner for removing the hydrogen and methane will be briefly described although any other conventional method may be employed. Hydrocarbon gases, such as refinery gases, are conducted through line 1 having a compressor 2 to a fractionating tower 3 having suitable plates or fractionating trays 4. The fractionating tower 3 is maintained at a sufficiently low temperature and at a sufficiently high pressure to effect separation of the hydrogen and methane in gaseous condition from hydrocarbon gas largely composed of constituents having from two to four carbon atoms per molecule in liquefied condition. The hydrogen and methane in gaseous condition are removed from the fractionating tower 3 through line 5 having a valve 6 and the liquefied hydrocarbons of from two to four carbon atoms per molecule collect in the lower portion of the tower 3. These liquefied hydrocarbons are withdrawn from tower 3 through line 7 and are passed to a suitable accumulator 8. The normally gaseous hydrocarbons from accumulator 8 are conducted through line 9 to charging line 10. The charging line 10 is provided with a compressor pump 11 for compressing the gas below the vaporization pressure thereof. The pressure required will depend upon the nature of the gas and may range from 200 to 1200 or more pounds per square inch. In case of refinery gas a pressure between 300 and 600 pounds per square inch is usually adequate.

The pressure side of compressor pump 11 discharges through line 12 which terminates in a nozzle ring 13 located near the bottom of the absorption tower 14, from whence the liquefied gas passes upwardly through the tower countercurrent to a flow of alkaline solution introduced into the top of the tower through nozzle 15. The invention preferably contemplates the use of dilute solution of sodium carbonate containing from 1 to 6% sodium carbonate although other weak alkaline solutions may be employed.

The flow of liquefied gas and alkaline solution is regulated to give the desired purifying effect. The tower 14 may, as shown, contain solid contact or packing material 17, for example loosely spaced brick located on spaced trays within the tower.

Preferably the rings 13 and 15 are sufficiently spaced from the ends of the tower 14 to provide for separating zones below and above the same, respectively.

The purified, liquefied gas is withdrawn from the top of tower 14 through line 18 and may be passed to storage tanks (not shown) or directly to further processing equipment such as a polymerization unit. The fouled alkaline solution is withdrawn from the bottom of tower 14 through line 19 provided with reducing valve 20 and discharges under reduced pressure into the top of actifying tower 21. The actifying tower 21 preferably contains solid contact material, which may be in the form of loose brick 23 disposed on spaced perforated trays 24.

Air or other inert gas may be passed into the tower 21 through line 26 and blown upwardly through the tower by means of blower 27 countercurrent to the flow of the alkaline solution.

The actified solution is withdrawn from the bottom of the actifying tower 21 through line 28 and passed to an accumulating tank 29 from which it may be withdrawn through line 30 and forced by means of a pump 31 to a cooler 32 and thence to the spray nozzle 15 in the purifying tower 14 and recycled through the system. The hydrocarbons undergoing treatment and the purifying solution in the tower 14 are preferably maintained at atmospheric temperature or thereabout.

The hydrogen sulphide liberated, combined with inert gas introduced in the bottom of the tower 21, in case such gas is introduced, is removed from actifying tower 21 through a vent pipe 33. Carbon dioxide to replenish that removed in the actifying tower, or steam, may be introduced into the bottom of the tower through a line 34. An indirect heating coil 35 may be provided as shown in the bottom of the tower 21.

If desired carbon dioxide for replenishing the solution may be introduced into the relatively cooler reactified solution on the high pressure side of the cycle through line 36 beyond the cooling coil 32.

The operability of the process is made possible by relative reaction velocities of the following reversible reaction under different temperature and pressure conditions:

$$Na_2CO_3 + H_2S \rightleftharpoons NaHS + NaHCO_3$$

By liquefying the gases to be treated the concentration of the hydrogen sulphide in the purifier is increased, thus shifting the reaction equilibrium to the right to form a relatively larger proportion of sodium hydrosulphide, and by reducing the pressure in the actifier substantially below that existing in the purifier and below the vaporizing pressure of hydrogen sulphide the reaction equilibrium is shifted back to the left, thus releasing the hydrogen sulphide as a gas. It will be observed that according to my process, liquid phase conditions prevail in the purifier, whereas in the actifier the hydrogen sulphide is in vapor phase and is removed from the system as formed.

It will be understood that fresh solution should be added to the system continuously or from time to time to maintain the desired strength and to replace that lost by unfavorable side reactions.

Having described the preferred embodiment, it is understood that my invention embraces such other modifications and variations as come within the spirit and scope thereof and that it is not my intention to unduly limit the invention or dedicate any novel features thereof.

I claim:

1. A method of desulphurizing gases obtained from oil refinery operations which comprises separating hydrogen and methane from said gases to obtain normally gaseous hydrocarbons containing at least two carbon atoms per molecule therefrom, passing said normally gaseous hydrocarbons through a treating zone at a temperature sufficiently low and at a pressure sufficiently high to maintain said gases in liquefied condition, intimately contacting said gases while in liquefied state in said treating zone with a sodium carbonate solution capable of reacting with sulphur-containing compounds in said liquefied gas, separating the thus treated liquefied hydrocarbons from the sodium carbonate solution containing the sulphur compounds, passing the sodium carbonate solution containing the sulphur compounds to an activation zone and therein treating it to remove sulphur compounds at a lower pressure than that in said treating zone but not lower than atmospheric pressure to facilitate removal of sulphur compounds from the sodium carbonate solution and to reactivate the sodium carbonate solution for further use and returning the reactivated sodium carbonate solution thus obtained to said treating zone.

2. A method of desulphurizing gases obtained from oil refinery operations which comprises separating hydrogen and methane from said gases to obtain normally gaseous hydrocarbons containing at least two carbon atoms per molecule therefrom, passing said normally gaseous hydrocarbons through a treating zone at a temperature sufficiently low and at a pressure sufficiently high to maintain said gases in liquefied condition, intimately contacting said gases while in liquefied state in said treating zone with a sodium carbonate solution capable of reacting with sulphur-containing compounds in said liquefied gas, separating the thus treated liquefied hydrocarbons from the sodium carbonate solution containing the sulphur compounds, passing the sodium carbonate solution containing the sulphur compounds to an activation zone maintained under a lower pressure than that in said treating zone but not lower than atmospheric to facilitate removal of sulphur compounds and heating the sodium carbonate solution containing the sulphur compounds in said activation zone to reactivate the sodium carbonate solution for further use and returning the reactivated sodium carbonate solution thus obtained to said treating zone.

HORACE B. COOKE.